United States Patent [19]

Asada

[11] Patent Number: 5,801,348
[45] Date of Patent: Sep. 1, 1998

[54] ACCELERATION DETECTOR

[75] Inventor: Satoshi Asada, Tokyo, Japan

[73] Assignee: Mitsubishi Denki Kabushiki Kaisha, Tokyo, Japan

[21] Appl. No.: 696,501

[22] Filed: Aug. 14, 1996

[30] Foreign Application Priority Data

Jan. 31, 1996 [JP] Japan ................ 8-015448

[51] Int. Cl.$^6$ ................ H01H 35/14
[52] U.S. Cl. ................ 200/61.53
[58] Field of Search ............. 200/61.45 R–61.45 M

[56] References Cited

U.S. PATENT DOCUMENTS

| | | | |
|---|---|---|---|
| 3,132,220 | 5/1964 | Uri et al. | 200/61.45 |
| 3,571,539 | 3/1971 | Kaiser | 200/61.53 |
| 3,715,535 | 2/1973 | Urenda | 200/61.53 |
| 3,771,457 | 11/1973 | Buxton | 102/70.2 R |
| 3,889,130 | 6/1975 | Breed | 307/121 |
| 4,097,699 | 6/1978 | Larson | 200/61.45 R |
| 4,210,789 | 7/1980 | Ushiku et al. | 200/61.45 R |
| 4,705,959 | 11/1987 | Kiyono et al. | 307/9 |
| 4,873,401 | 10/1989 | Ireland | 200/61.45 M |
| 5,304,756 | 4/1994 | Shimozono et al. | 200/61.45 M |
| 5,306,883 | 4/1994 | Manandhar et al. | 200/61.53 |
| 5,315,245 | 5/1994 | Schroeder et al. | 324/207.21 |
| 5,373,126 | 12/1994 | Manandhar et al. | 200/61.53 |
| 5,585,607 | 12/1996 | Kato et al. | 200/61.53 |

*Primary Examiner*—Michael L. Gellner
*Assistant Examiner*—Michael A. Friedhofer
*Attorney, Agent, or Firm*—Sughrue, Mion, Zinn, Macpeak & Seas, PLLC

[57] ABSTRACT

A mass body and a moving contact are integrated so that the moving contact comes in slide contact with a fixed contact disposed on the inner peripheral surface of a case, whereby a slide part and a switch part are shared and an acceleration detector miniatures particularly in an axial direction.

17 Claims, 14 Drawing Sheets

ACCELERATION DETECTOR

BACKGROUND OF THE INVENTION a) Field of the Invention

This invention relates to an acceleration detector being installed in a mobile unit such as an automobile for detecting the acceleration of the mobile unit.

b) Related Art

Hitherto, various acceleration detectors used with a collision detector for detecting acceleration occurring when an automobile, etc., collides with something and outputting an electric signal to an air bag starter for starting an air bag have been known.

FIG. 16 is a perspective view showing a conventional acceleration detector generally used, wherein numeral 101 is a mass body having a predetermined mass and numeral 102 is a slide shaft for limiting the displacement direction of the mass body 101 to one direction and slidably supporting the mass body 101. Numeral 103 is a coil spring for pressing the mass body 101 in one direction, numeral 104 is a moving contact displaced following a move of the mass body 101, and numeral 105 is a connection terminal being connected to the moving contact 104 for taking out an electric signal. Numeral 106 is a fixed contact coming in contact with and energized through the moving contact 104 when the mass body 101 moves a given distance against the press force of the coil spring 103, thereby taking out an electric signal. Numeral 107 is a stopper being fixed to the slide shaft 102 by a screw for regulating the travel distance of the mass body 101 and holding the coil spring 103 at one end.

Numeral 108 is a base molded in one piece having a slide shaft as an integral part, to which the connection terminal 105 and the fixed contact 106 are fixed. The base 108 is provided with terminals 108a and 108b for outputting an electric signal to the outside. The terminal 108a is electrically connected to the moving contact 104 and the terminal 108b is electrically connected to the fixed contact 106. Numeral 109 is a cover forming a case together with the base 108 for preventing external dust, etc.

The collision detector is attached with the stopper 107 oriented to the front of a car body.

Next, the operation of the detector will be discussed. When large deceleration occurs on the car body due to a collision, etc., if the mass body 101 receives an inertial force caused by the deceleration and overcomes the elastic force of the coil spring 103 (spring set load), the mass body 101 slides on the slide shaft 102 toward the stopper 107 while compressing the coil spring 103.

At the normal time other than the collision time, a support part 101a projecting from the mass body 101 and a tip 104c of the moving contact 104 abut each other and a beam part 104a of the moving contact 104 warps, thereby providing a plate spring function. The spring force of the beam part 104a causes the moving contact 104 to be pressed against the support part 101a. When the mass body 101 moves, the moving contact 104 follows it and elastically deforms in a direction in which warping of the beam part 104a of the moving contact 104 decreases. When the warping amount of the beam part 104a of the moving contact 104 decreases to a given amount, a contact 104b of the moving contact 104 comes in contact with the fixed contact 106, providing electric conduction between the connection terminal 105 and the fixed contact 106.

As described above, in the conventional collision detector, the coil spring 103, the mass body 101, and the moving contact 104 are placed separately on the axis of the slide shaft, thus it is particularly difficult to axially miniaturize the detector.

A detector failure, particularly a failure such as deformation of the moving contact cannot be detected.

SUMMARY OF THE INVENTION

It is an object of the invention to a miniaturized acceleration detector.

It is another object of the invention to provide an acceleration detector capable of making a failure determination.

To achieve the above-noted and other objects, the present invention provides an acceleration detector comprising: a mass body having a predetermined mass; a slide shaft slidably supporting the mass body; first and second regulation parts for limiting a slide range of the mass body at respective ends of the slide shaft; an elastic member disposed between the first regulation part and the mass body, and providing an elastic force for biasing the mass body in a direction toward the second regulation part; a case having at least one of the first and second regulation parts; a first contact integrally provided on the mass body; and a second contact provided on the case, wherein when the mass body slides on the slide shaft against the elastic force of the elastic member, the first contact slides together with the mass body, and when the first contact slides a predetermined distance, the first contact comes in contact with the second contact, to thereby establish an electric conduction between the first and second contacts.

In the detector, a notch is formed in the case, and when the mass body abuts the second regulation part by the elastic force of the elastic member, the first contact is located in the notch.

In the detector, the first regulation part is made of thermoplastic elastomer.

In the detector, the second contact is integrally formed on the case simultaneously when the case is molded, and the second contact has a removal stopper projected therefrom.

In the detector, a lid provided with the second regulation part and the case are formed with a recess and a mating projection, respectively, and the lid is fixed to the case by inserting the projection into the recess.

In the detector, a lid provided with the second regulation part is fixed to the case by thermal caulking.

In the detector, a lid provided with the second regulation part is provided with a seal part and is fixed to the case so that the seal part abuts the case.

The present invention further provides an acceleration detector comprising: a mass body having a predetermined mass; a slide part for slidably supporting the mass body; a regulation part for limiting a slide range of the mass body; a biasing part for biasing the mass body in a predetermined direction; a first contact provided integrally on the mass body and slidable together with the mass body; and a second contact that the first contact abuts or leaves, wherein when predetermined acceleration occurs on the mass body, the mass body slides on the slide part against a biasing force of the biasing part and the first contact abuts or leaves the second contact.

In the detector, the slide part includes a slide shaft fixed at both ends to the regulation part.

In the detector, a case is provided for housing the mass body therein, the case having a rotation stopper abutable against the mass body for regulating rotation of the mass body about the slide shaft.

In the detector, a tip of the first contact has a curved surface.

In the detector, an end of the second contact has a curved surface.

In the detector, the regulation part is provided with a shock absorption member abutable against the mass body for absorbing shock.

In the detector, the mass body is made up of two mass members, and the first contact is sandwiched and fixed between the two mass members.

In the detector, the first contact has a rotation stopper therefrom in parallel with the slide shaft and abutable against the mass body for stopping rotation of the first contact.

In the detector, the mass body is molded by executing sintering molding or injection molding of metal powder.

The present invention further provides an acceleration detector comprising: a mass body having a predetermined mass; a slide part for slidably supporting the mass body; a regulation part for limiting a slide range of the mass body; a biasing part for biasing the mass body in a predetermined direction; a first contact integrally provided on the mass body and slidable together with the mass body; and second and third contacts that the first contact abuts or leaves, wherein when the mass body abuts the regulation part by the biasing part, the first contact abuts the third contact, and when predetermined acceleration occurs on the mass body and the mass body slides on the slide part against a biasing force of the biasing part, the first contact abuts the second contact.

In the detector, a fault determination section is provided for sensing whether or not the first contact abuts the third contact and making a fault determination.

In the detector, the second contact is disposed on an inner peripheral surface of the case, and the first contact is disposed on a face of the mass body opposed to the inner peripheral surface of the case.

DETAILED DESCRIPTION OF THE PREFERRED EMBODIMENTS

Referring now to the accompanying drawings, there are shown preferred embodiments of the invention.

FIRST EMBODIMENT

Figure 1:
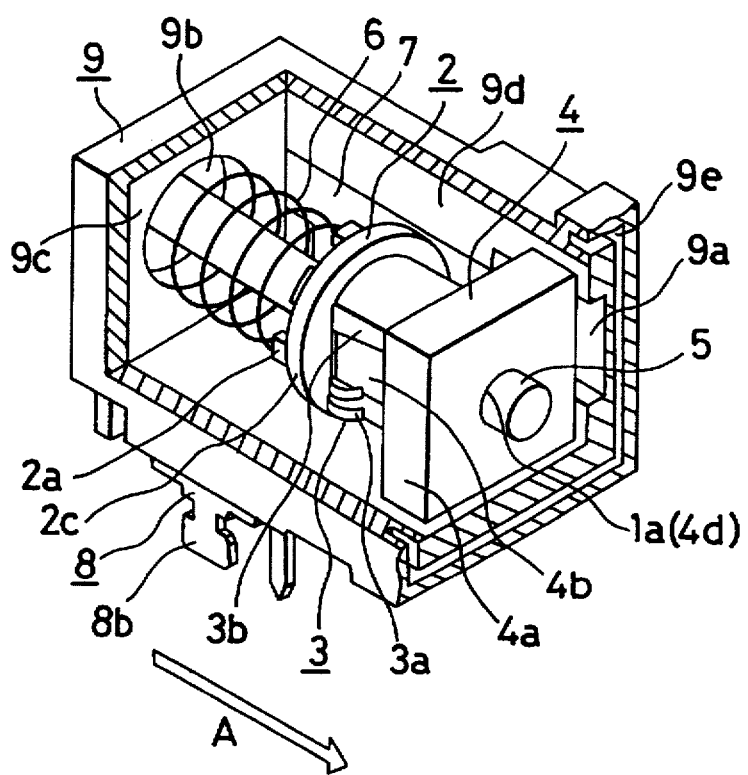
FIG. 1 is a partially cutaway perspective view of a housing to show of a first embodiment of the invention.
Figure 2:
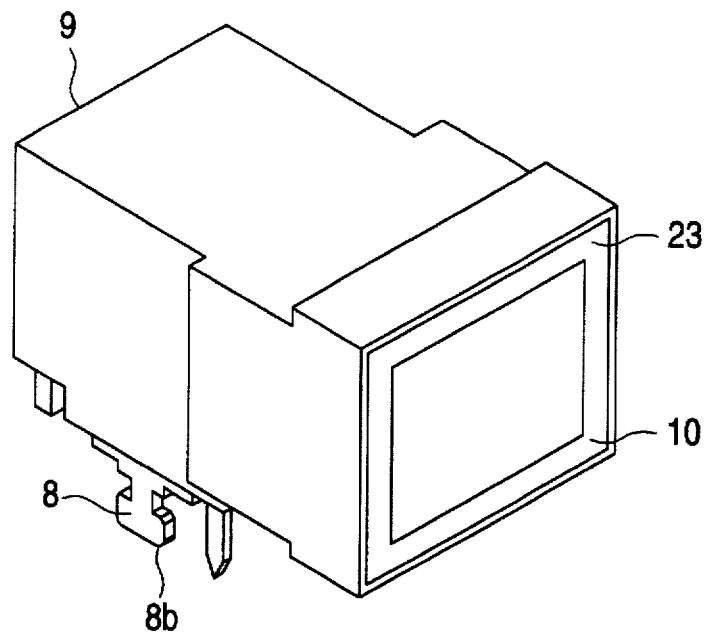
FIG. 2 is an external perspective view to show the first embodiment of the invention.
Figure 3:
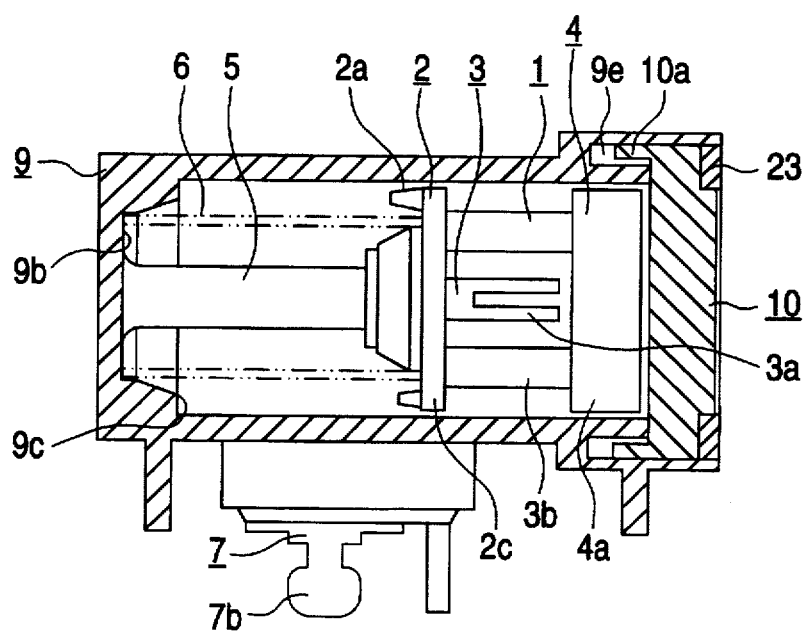
FIG. 3 is a longitudinal sectional view to show the first embodiment of the invention.
Figure 4:
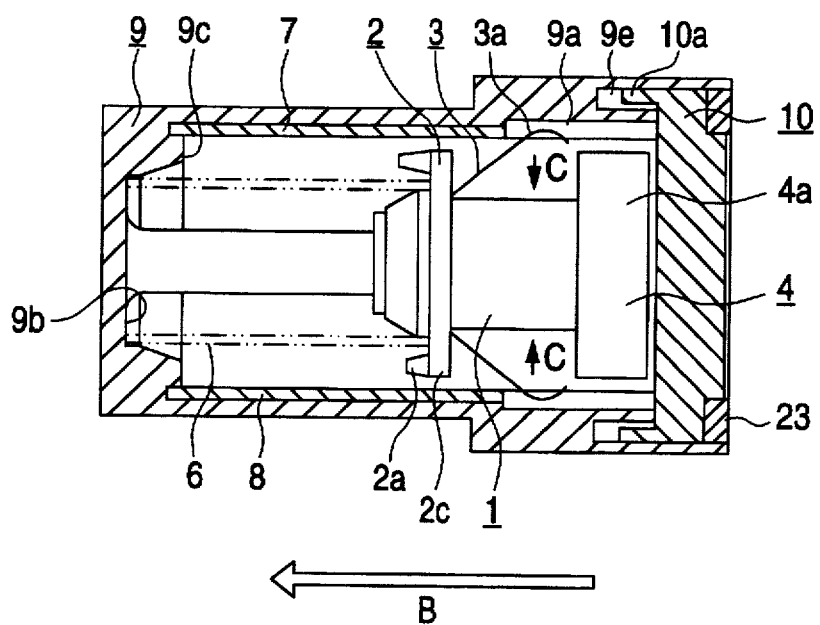
FIG. 4 is a transverse sectional view to show the first embodiment of the invention.
Figure 5:
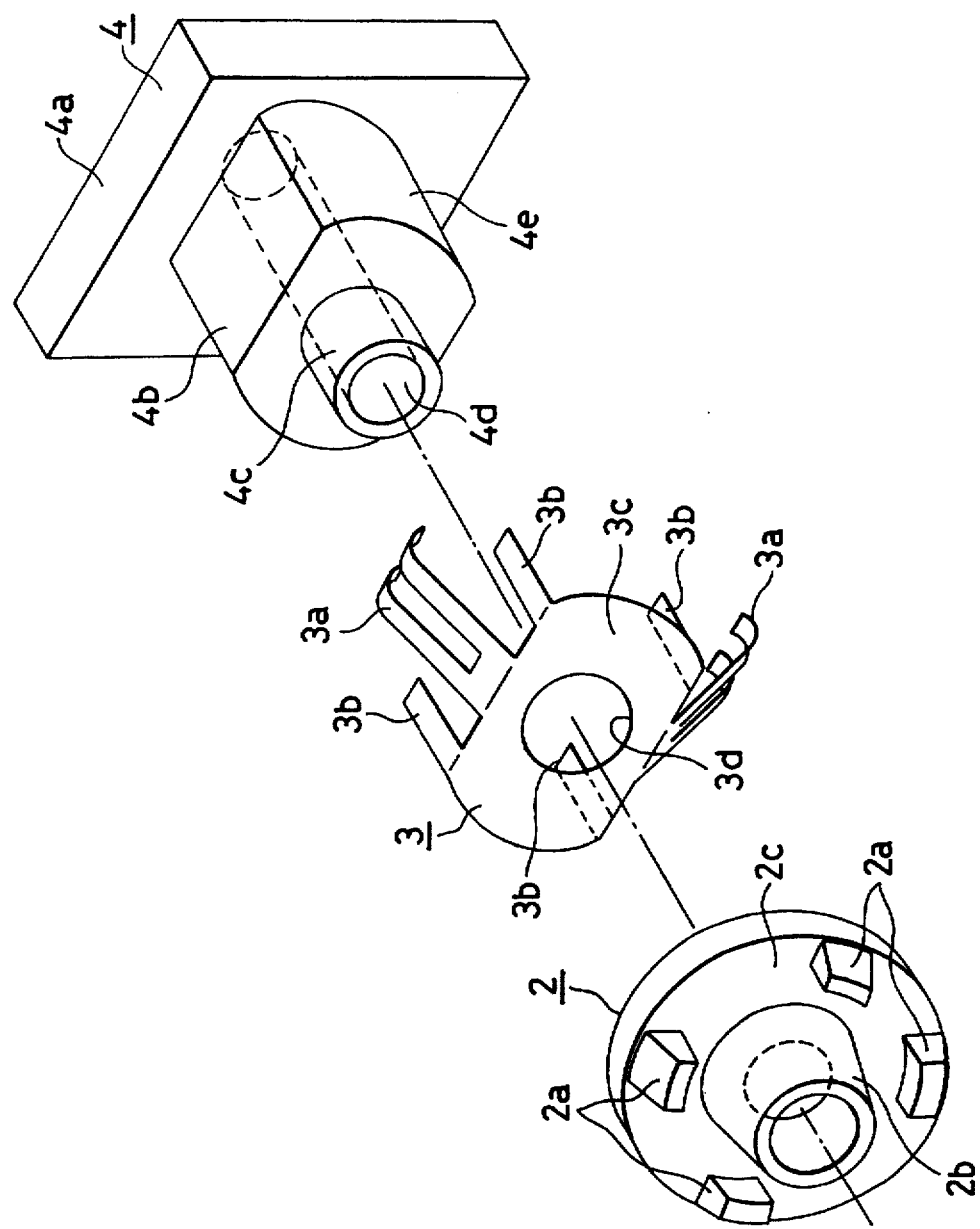
FIG. 5 is a perspective view to show parts of a mass body in the first embodiment of the invention.

FIG. 1 is a partially cutaway perspective view of a housing for explanation to show a detector of a first embodiment of the invention. FIG. 2 is an external perspective view. FIG. 3 is a longitudinal sectional view. FIG. 4 is a transverse perspective view. FIG. 5 is a perspective view to show parts of a mass body. FIG. 6 is a perspective view to show the caulked mass body. FIG. 7 is a perspective view to show a fixed contact.

In the figures, numeral 1 is a mass body made of metal having a predetermined mass with a through hole 1a made at the center. The acceleration detection characteristics of the detector are determined by such factors as the mass of the mass body 1 and a moving contact 3 (described below) fixed to the mass body 1, the elastic force of a coil spring 6 (described below), frictional resistance at the slide time between the moving contact 3 and a fixed contact 7, 8 (described below), and frictional resistance at the slide time between the mass body 1 and a slide shaft 5 (described below). Numeral 2 is a first mass member for forming a part of the mass body 1. Numeral 3 is a moving contact as a first contact having two contacts 3a, which is built integrally in the mass body 1 and is displaced following slide of the mass body 1. Numeral 4 is a second mass member for forming the mass body 1 in cooperation with the first mass member 2 and being square in part of cross section. The first mass member 2 and the second mass member 4 make up the mass body 1.

Numeral 5 is a slide shaft as a slide part passing through the through hole 1a of the mass body 1 and slidably supporting the mass body 1 while limiting the move direction of the mass body 1 to the axial direction. Numeral 6 is a coil spring as a biasing part or an elastic member for pressing the mass body 1 in one direction indicated by arrow A in FIG. 1. The coil spring 6 is placed so as to abut the mass body 1 at one end and a housing 9 (described below) at the other end. Numerals 7 and 8 are fixed contacts as second contacts placed on the inner face of the housing so as to be opposed to each other and sandwich the slide shaft 5 therebetween, and connected to different terminals. Numeral 9 is a housing made of synthetic resin, which is a part of a case molded. This housing 9 is provided with a notch 9a for housing the contact 3a of the moving contact 3 being out of contact with the fixed contact 7, 8, a coil spring fixing part 9b for fixing one end of the coil spring 6, a first stopper 9c for regulating a move of the mass body 1, and a rotation stopper 9d for preventing the mass body 1 from rotating about the slide shaft 5. Numeral 10 is a second stopper as a lid and a second regulation part for stopping slide of the mass body 1 to the direction opposite to the collision detection direction of a vehicle (arrow A direction in FIG. 1). The second stopper 10 is combined with the housing 9 to form the case of the detector as shown in FIG. 2 for preventing the entry of dust, etc., from the outside.

As shown in FIG. 5, the first mass member 2 is provided with shock absorbing elements 2a for absorbing shock at the collision time with the first stopper 9c, a taper part 2b for guiding the coil spring 6 and serving as a seat surface when the first mass member 2 is coupled to the coil spring 6, and a base 2c used as a base material on which the shock absorbing elements 2a and the taper part 2b are placed. The shock absorbing elements 2a using a material having a large shock absorbing capacity as compared with other parts (for example, thermoplastic elastomer) are fixed to the base 2c for removal prevention, etc., by baking onto the base 2c, or by passing the shock absorbing elements 2a axially through holes made in the base 2c and turning them to the surface and rear of the base 2c. Here, the taper part 2b and the base 2c are molded integrally.

The moving contact 3 is made up of two contacts 3a, positioning nails 3b, and a sandwich part 3c. The faces of the contacts 3a coming in contact with and sliding on the fixed contacts 7 and 8 are plated with Au for enhancing conductivity. The tip of each contact 3a is divided into two pieces, thereby adjusting the elastic force of the tip and ensuring contact between the contact 3a and the fixed contact 7, 8 even when the contact 3a inclines to the fixed contact 7, 8. The tip is rounded, namely, is bent. Since each contact 3a is of a linear cantilever form with respect to the mass body 1, the contact face between the contact 3a and the fixed contact 7, 8 becomes stable. The positioning nails 3b abut the second mass member 4, thereby positioning the moving contact 3 and preventing rotation. The sandwich part 3c is sandwiched and fixed between the first mass member 2 and the second mass member 4.

The second mass member 4 includes a plate part 4a of square cross section, which abuts the rotation stopper 9d of the housing 9 for regulating rotation of the mass body 1, a positioning part 4b that the positioning nails 3b of the moving contact 3 abut, a caulked joint part 4c passing through the first mass member 2 and the moving contact 3 and then caulked and joined, and a through hole 4d through which the slide shaft 5 passes.

Figure 6A:
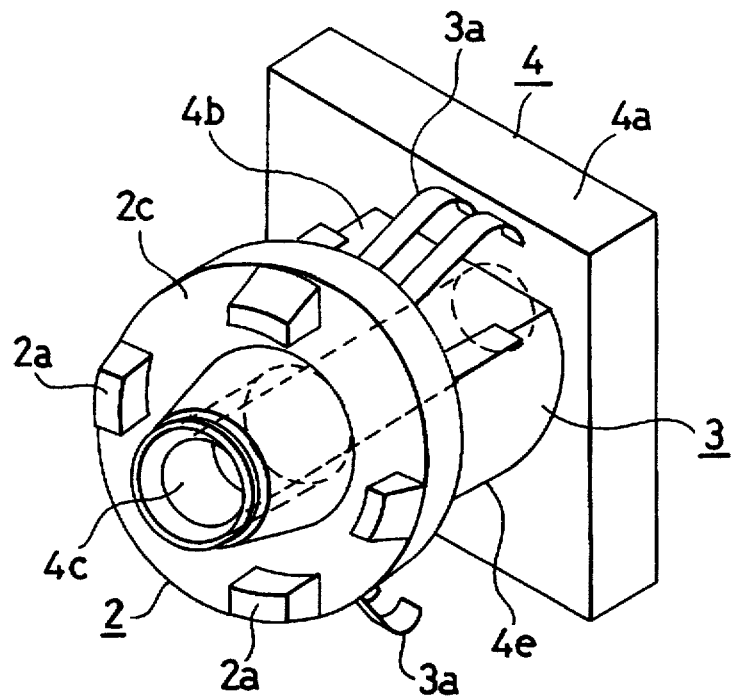
FIGS. 6A and 6B are perspective views to show different caulking examples for the mass body in the first embodiment of the invention.
Figure 6B:
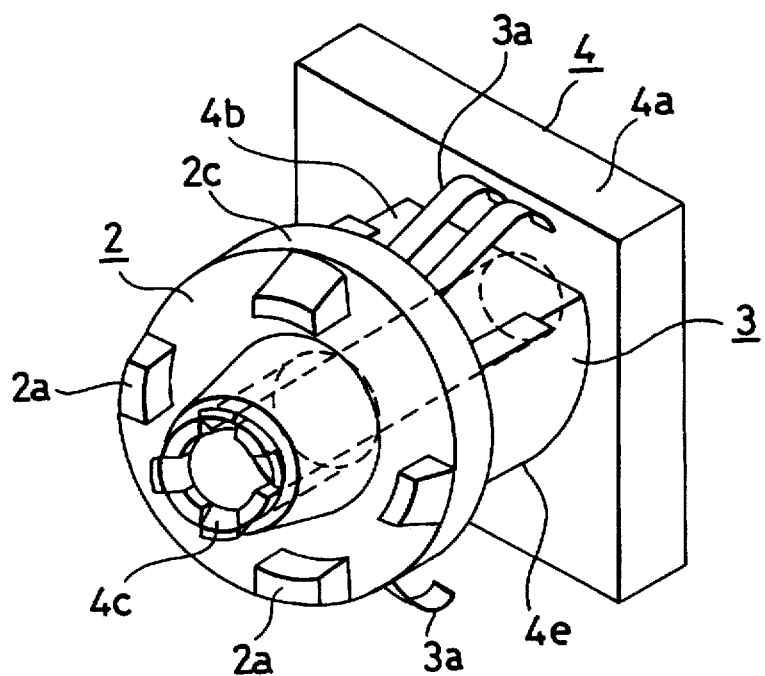
Figure 7:
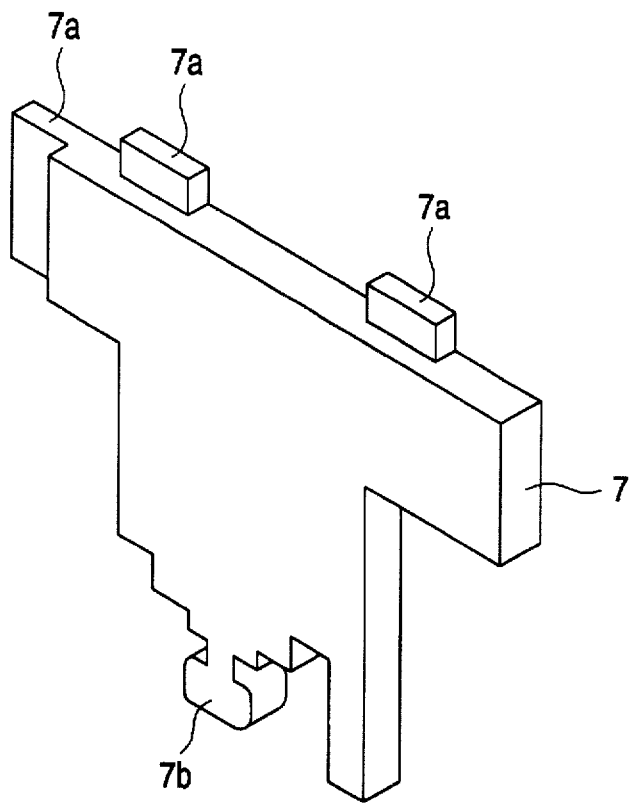
FIG. 7 is a perspective view to show a fixed contact in the first embodiment of the invention.

FIGS. 6A and 6B show caulking examples with the caulked joint part 4c. In FIG. 6A, the tip of the caulked joint part 4c is plastically worked so as to spread at an angle of 45 degrees over the full circumference. In FIG. 6B, the tip of the caulked joint part 4c is plastically worked so as to spread four points of a predetermined width at about 45 degrees. Thus, the first mass member 2 and the second mass member 4 are reliably fixed by caulking and the moving part 3 is sandwiched and fixed therebetween.

Although caulking examples are given here, any other fixing method, such as screwing, may be used.

The fixed contact 7 is fixed at the same time as the housing 9 is molded; gate positions are provided on both outsides of the fixed contact 7 so that resin pressure is applied to the fixed contact 7 to force the fixed contact 7 against an inner metal die the during molding, thereby preventing mold resin from flowing to the face of the fixed contact 7 coming in contact with the moving contact 3. The fixed part 7 is formed in the periphery with several crush parts 7a made by stamping as removal prevention. Since the fixed contact 7 is fixed to the housing 9 with the crush parts 7a buried in the mold resin, it is reliably fixed and floating of the fixed part 7 at the molding time of the housing 9 is prevented.

Terminals 7b and 8b are connected to an external system, and whether or not acceleration exceeds a predetermined value, namely, a collision occurs is sensed based on whether or not an electric current flows between the terminal 7b of one fixed contact 7 and the terminal 8b of the other fixed contact 8.

Next, the operation will be discussed.

First, when the vehicle runs normally, the mass body 1 is pressed against the second stopper 10 by the elastic force of the coil spring 6, thus the contacts 3a of the moving contact 3 are out of contact with the fixed contacts 7 and 8. Therefore, the fixed contacts 7 and 8 are not electrically connected to the moving contact 3. Of course, the fixed contacts 7 and 8 are not electrically connected and no electric signal flows between terminals. This indicates the normal state in which the vehicle does not collide with anything, because a collision of the vehicle is detected by the fact that an electric signal flows.

When the vehicle runs normally, the contacts 3a of the moving contact 3 are in notches 9a made in the housing 9 and the notches 9a are sized so as not to abut the contacts 3a, so that the contacts 3a are not in contact with anything, thereby preventing wear of the contacts 3a by car body vibration when the vehicle runs. Since the contacts 9a are out of contact with the housing 9, corrosion, oxidation, etc., of the contacts 3a of the moving part 3 becomes hard to be caused by the compounding agent, etc., contained in the material itself of the housing 9.

Next, when the vehicle collides with something, the mass body 1 slidably held undergoes deceleration (acceleration) larger than the elastic force of the coil spring 6 and moves toward the first stopper 9c (in the arrow B direction in FIG. 4). When the mass body 1 moves at this time, the contacts 3a of the moving contact 3 come in contact with the fixed contacts 7 and 8, are bent in the arrow C directions in FIG. 4, so that the contacts 3a of the moving contact 3 slide linearly while being kept in contact with the fixed contacts 7, 8 and bent. At this time, the fixed contacts 7 and 8 continue to be electrically connected to the moving contact 3. Therefore, while the vehicle collides and the mass body 1 undergoes deceleration, an electric signal flows and the collision of the vehicle can be detected.

When the moving contact 3 slides on the fixed contact 7, in a state in which the contact 3a of the moving contact 3 abuts the fixed contact 7 and is bent, a contact reaction force of attempting to restore the contact 3a to the former state occurs in the direction of the fixed contact 7 and a frictional force occurs between the contact 3a and the fixed contact 7. For the mass body 1 to smoothly slide without stopping at a midpoint of the fixed contact 7, the elastic force of the coil spring 6 needs to be large at least as compared with the frictional force with the fixed contact 7, 8 caused by the contact reaction force of the contact 3a of the moving contact 3.

When the vehicle collides strongly, the mass body 1 overcomes the elastic force of the coil spring 6, arrives at the first stopper position, and collides with the first stopper 9b, whereby the moving contact 3 of the mass body 1 is directly vibrated or a shock wave is transmitted to the fixed contact 7, which is vibrated, whereby the fixed contact 7 and the moving contact 3 are momentarily placed out of contact with each other in accordance with the vibration (this phenomenon is so-called chattering). To avoid this chattering, the first mass member 2 is provided with the shock absorbing elements 2a for dampening shock energy occurring at the collision time and preventing the chattering.

The seal form of the housing 9 and the second stopper 10 will be discussed.

The housing 9 and the second stopper 10 are combined to complete the assembly of the case, namely, they serve as the case of the detector.

As shown in FIG. 3, the housing 9 is formed with a groove 9e on the seal face and the second stopper 10 is formed with a rib 10a at position corresponding to the groove 9e on the seal face. Thus, if the second stopper 10 is fitted into the housing 9, the groove 9e and the rib 10 form a labyrinth structure, which can keep the inside of the detector in airtight relation and prevent the entry of dust into the detector.

To furthermore ensure the sealing, a seal agent such as epoxy resin is applied from the side of the second stopper 10 and is hardened; the groove 9e and the rib 10 form the labyrinth structure, preventing the seal agent such as epoxy resin from flowing into the inside.

Figure 17:
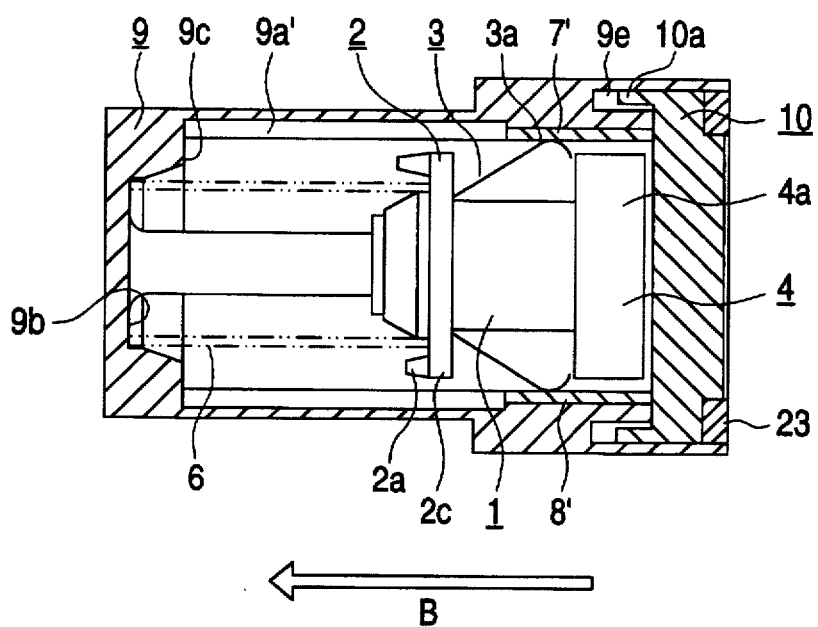
FIG. 17 is a transverse sectional view to show a modification of the first embodiment of the invention.

In addition, the first embodiment may be modified as shown in FIG. 17. That is, as designated by reference numerals 7', 8' and 9a', the fixed contacts 7', 8' serving as second contacts and the notches 9a for accommodating the contacts 3a of the moving contacts 3 are provided at different locations from those of the first embodiment. That is, the modification shown in FIG. 17 are arranged so that the electrical connection between the movable contacts and the fixed contacts 7', 8' is maintained during the normal state, whereas if the acceleration beyond the predetermined value is exerted, then the movable contacts 3 become out of contact with the fixed contacts 7', 8' to prohibit the current flow, to thereby detect the vehicle collision. Other constructions in the modification shown in FIG. 17 are the same as those in the first embodiments, so that the same reference numerals are applied thereto.

SECOND EMBODIMENT

Figure 8:
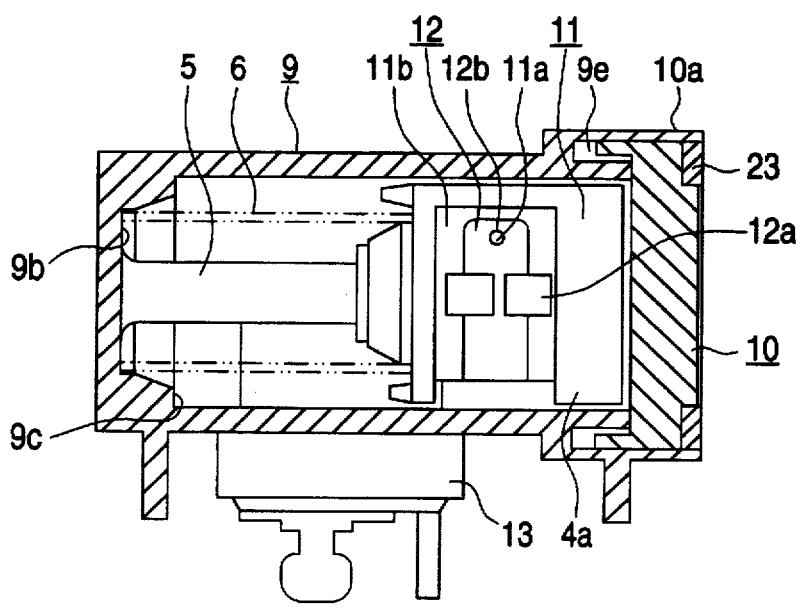
FIG. 8 is a longitudinal sectional view to show a second embodiment of the invention.
Figure 9:
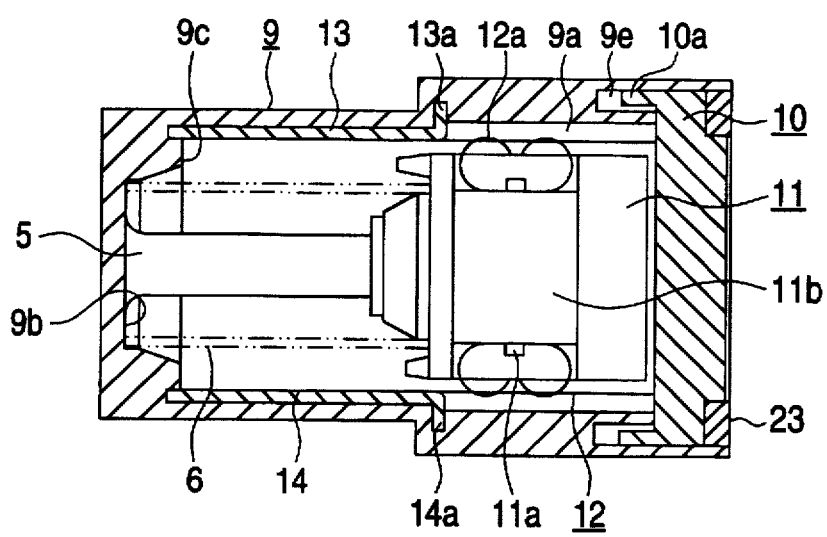
FIG. 9 is a transverse sectional view to show the second embodiment of the invention.
Figure 10:
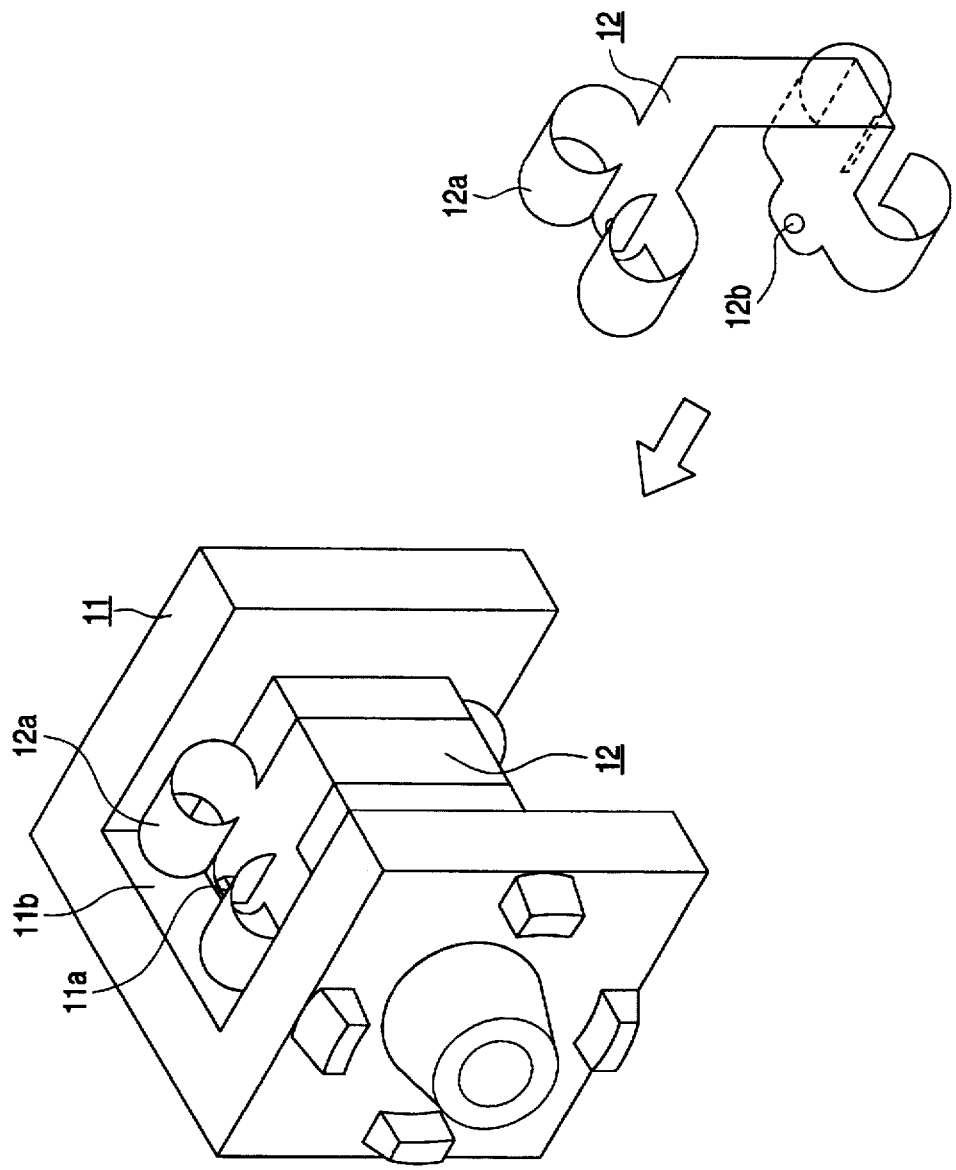
FIG. 10 is a perspective view to show a mass body in the second embodiment of the invention.

FIG. 8 is a longitudinal sectional view to show a second embodiment of the invention. FIG. 9 is a transverse sectional. FIG. 10 is a perspective view to show a mass body and a moving contact. The second embodiment of the invention differs from the first embodiment in forms of the mass body containing the moving contact and fixed contacts. Parts identical with or similar to those previously described in the first embodiment are denoted by the same reference numerals in the figures and will not be discussed again.

In the figures, numeral 11 is a mass body and numeral 12 is a moving contact disposed in the mass body 11. The moving contact 12 comprises two contacts 12a on one side, each of an about 270-degree arc beam form, in parallel with the slide direction of the mass body 11. Since two contacts 12a are provided on each side in parallel with the slide direction, the mass body 11 can stably slide back and forth in the slide direction.

Since the contacts 12a of arc beam form are opened in the opposite direction relative to the slide direction, they are bent in the opposite direction to the sliding direction at the sliding time on the fixed contacts 13 and 14 for absorbing an extra frictional force at the sliding time and making the sliding stable, thus preventing the contacts 12a from being caught in the fixed contacts 13 and 14 during the sliding and the sliding from stopping (described later).

A recess 11b of the mass body 11 is provided with bosses 11a into which holes 12b made in the moving contact 12 are fitted for fixing the moving contact 12 to the recess 11b of the mass body 11.

Numerals 13 and 14 are fixed contacts and tips 13a and 14a first coming in contact with the moving contact 12 have each a rounded form (curved surface form). Since the tips 13a and 14a have the rounded form, at the collision time of the vehicle, when the mass body 11 slides and the contacts 12a of the moving contact 12 come in contact with the fixed contacts 13 and 14 and attempt to run onto them, the contacts 12a can smoothly run onto the fixed contacts 13 and 14 and energy required for running onto them can be reduced, so that the mass body 11 can be slid smoothly. Since the energy loss at the sliding time can be decreased, the sliding time can be prolonged.

THIRD EMBODIMENT

Figure 11:
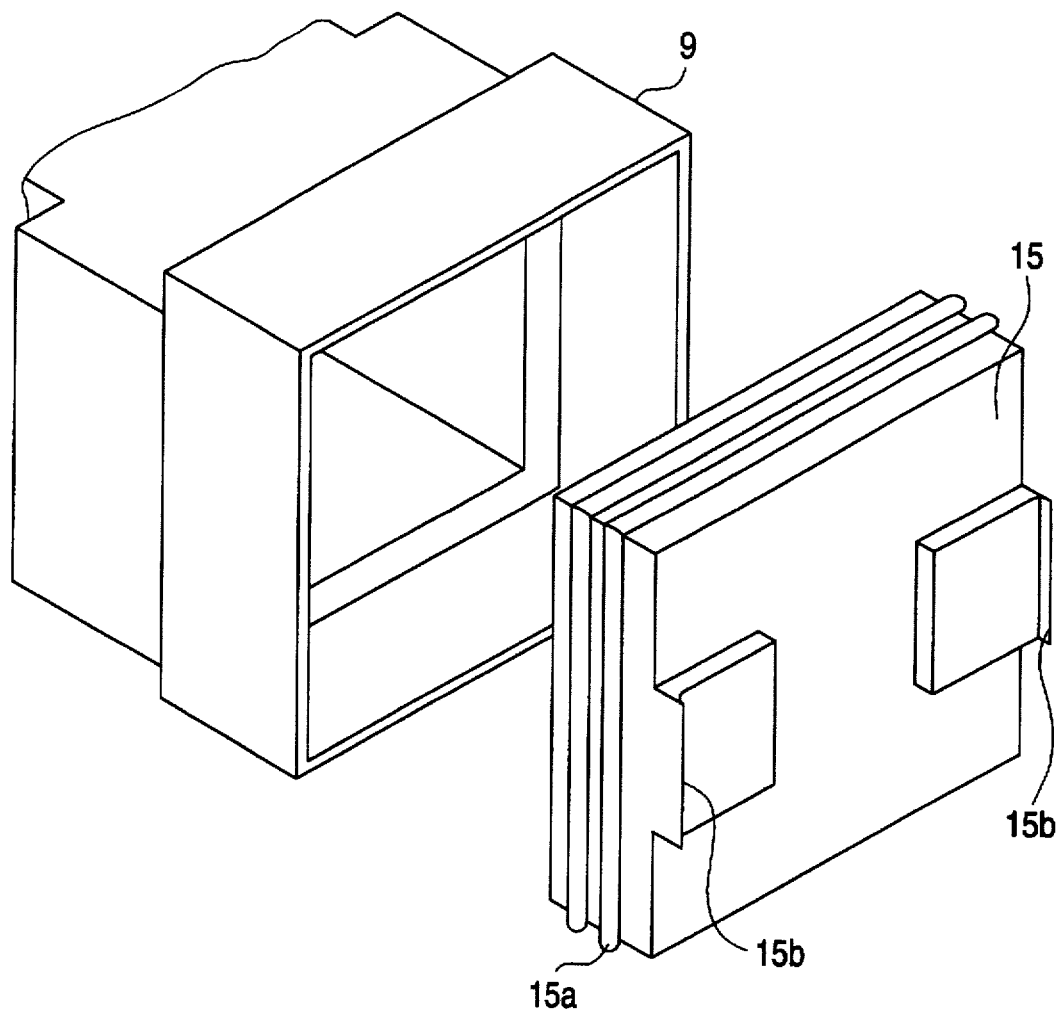
FIG. 11 is a fragmentary perspective view to show a third embodiment of the invention.

FIG. 11 is a perspective view to show a third embodiment of the invention. The third embodiment of the invention differs from the first embodiment in seal form of housing and second stopper. Parts identical with or similar to those previously described in the first embodiment are denoted by the same reference numerals in the figure and will not be discussed again.

In FIG. 11, numeral 15 is a second stopper which is provided with double rubber parts 15a as line-like seals, each semicircular in cross section, for reliable sealing, and welding parts 15b for thermal caulking of the outer wall of a housing 9.

The second stopper 15 is press-fitted into the housing 9, whereby the rubber parts 15a become elastically deformed for more reliable sealing.

When the vehicle collides with something, a mass body moves toward a first stopper. When application of deceleration stops, the mass body returns to the second stopper. The outer wall of the housing 9 and the welding parts 15b of the second stopper 15 are thermally caulked for removal prevention so as to resist to the collision force.

FOURTH EMBODIMENT

Figure 12:
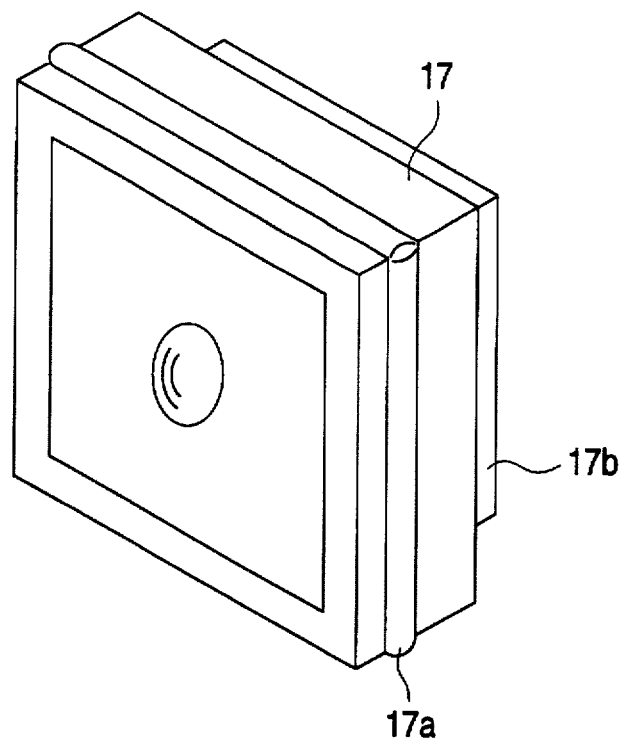
FIG. 12 is a fragmentary perspective view to show a fourth embodiment of the invention.

FIG. 12 is a perspective view to show a fourth embodiment of the invention. The fourth embodiment of the invention differs from the first embodiment in seal form of housing and second stopper. Parts identical with or similar to those previously described in the first embodiment are denoted by the same reference numerals in the figure and will not be discussed again.

In FIG. 12, numeral 17 is a second stopper. After the second stopper 17 is inserted into the housing 9, a seal agent such as epoxy resin is poured into a notch 17b of the second stopper 17, thereby fixing the housing 9 and the second stopper 17 for sealing them. At this time, the second stopper 17 is provided with a rubber seal part 17a of thermoplastic elastomer, etc., thus preventing the seal agent from flowing into the housing 9.

FIFTH EMBODIMENT

Figure 13:
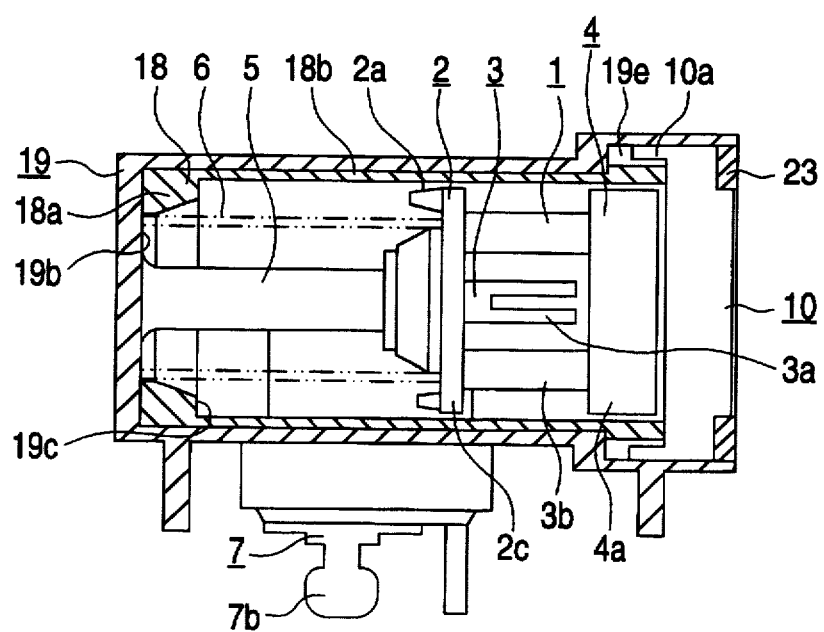
FIG. 13 is a longitudinal sectional view to show a fifth embodiment of the invention.

FIG. 13 is a longitudinal sectional view to show a fifth embodiment of the invention. The fifth embodiment of the invention differs from the first embodiment in housing. Parts identical with or similar to those previously described in the first embodiment are denoted by the same reference numerals in the figure and will not be discussed again.

In the fifth embodiment, a housing 19 is provided with an elastic member 18 made of thermoplastic elastomer of rubber property. The elastic member 18 is made up of a shock absorption part 18a for absorbing shock caused when a mass body 1 collides and a sound leakage prevention part 18b for preventing sound from leaking from the housing 19 to the outside.

When the vehicle collides, even if the mass body 1 overcomes the elastic force of a coil spring and arrives at the position of a first stopper 19c of the housing 19, the shock absorption part 18a absorbs and dampens shock energy produced when the mass body 1 collides with the shock absorption part 18a, and rapid bouncing back of the mass body 1 in the opposite direction is suppressed. Therefore, the mass body 1 does not cause chattering.

Vibration of the car body during running, etc., is transmitted to the collision detector and vibration sound is produced because of a slight clearance between a slide shaft and the mass body 1. The sound leakage prevention part 12b disposed in the cylindrical portion of the housing 19 blocks the vibration sound, thereby decreasing the sound pressure level and muffling the tone. Thus, noise from the collision detector can be made low, not grating on ears.

SIXTH EMBODIMENT

Figure 14:
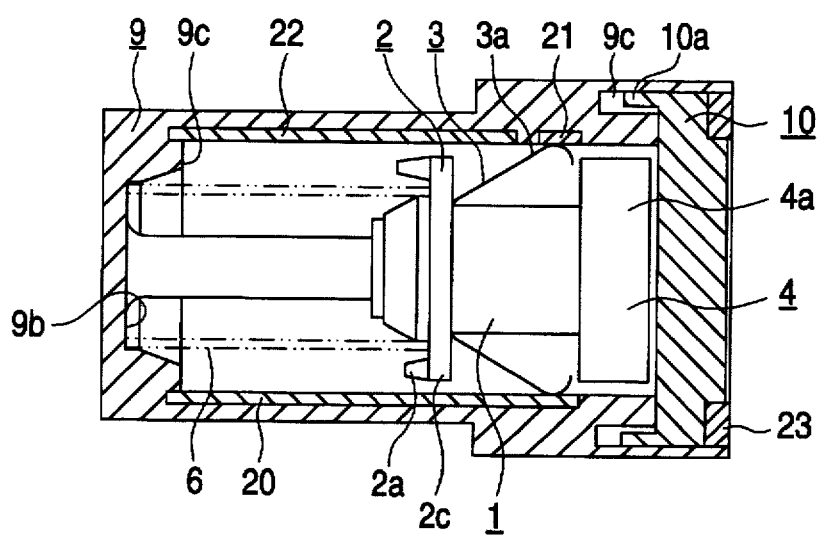
FIG. 14 is a transverse sectional view to show a sixth embodiment of the invention.
Figure 15:
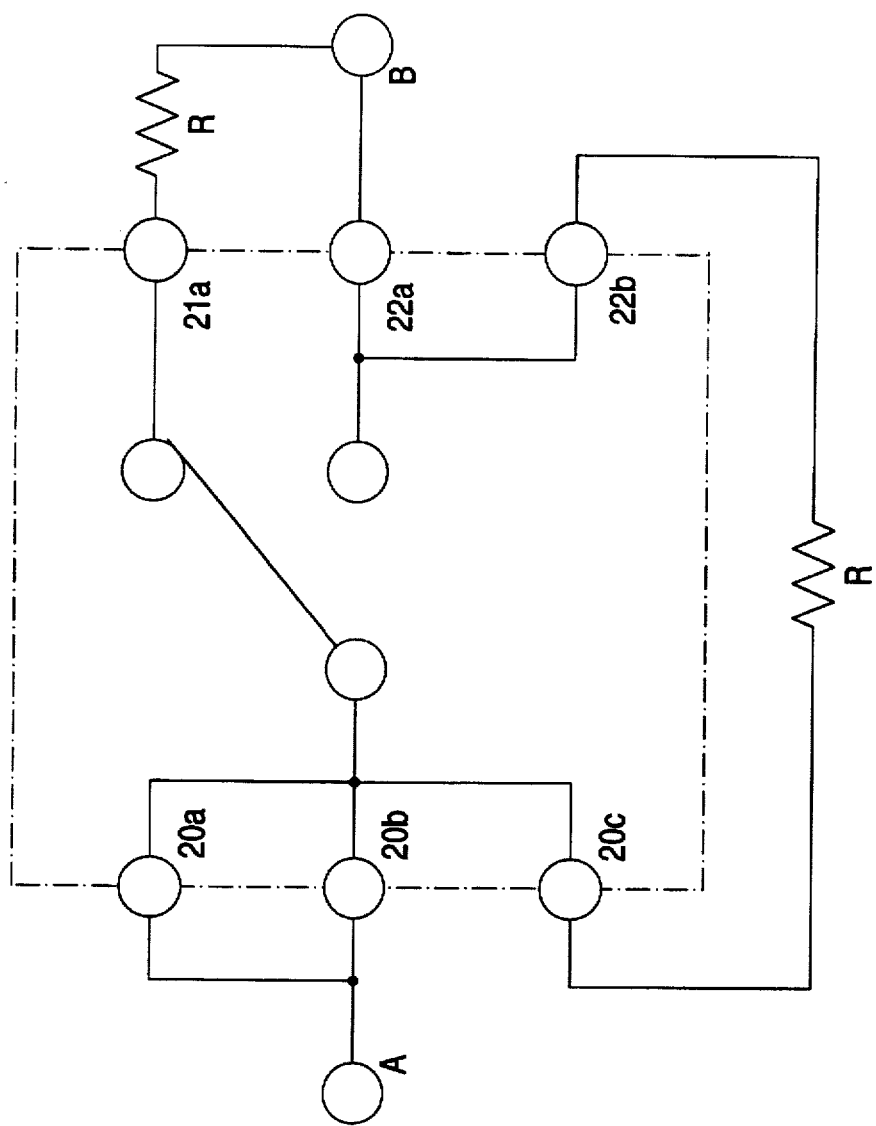
FIG. 15 is a wiring diagram to show wiring among signal terminals in the sixth embodiment of the invention.
Figure 16:
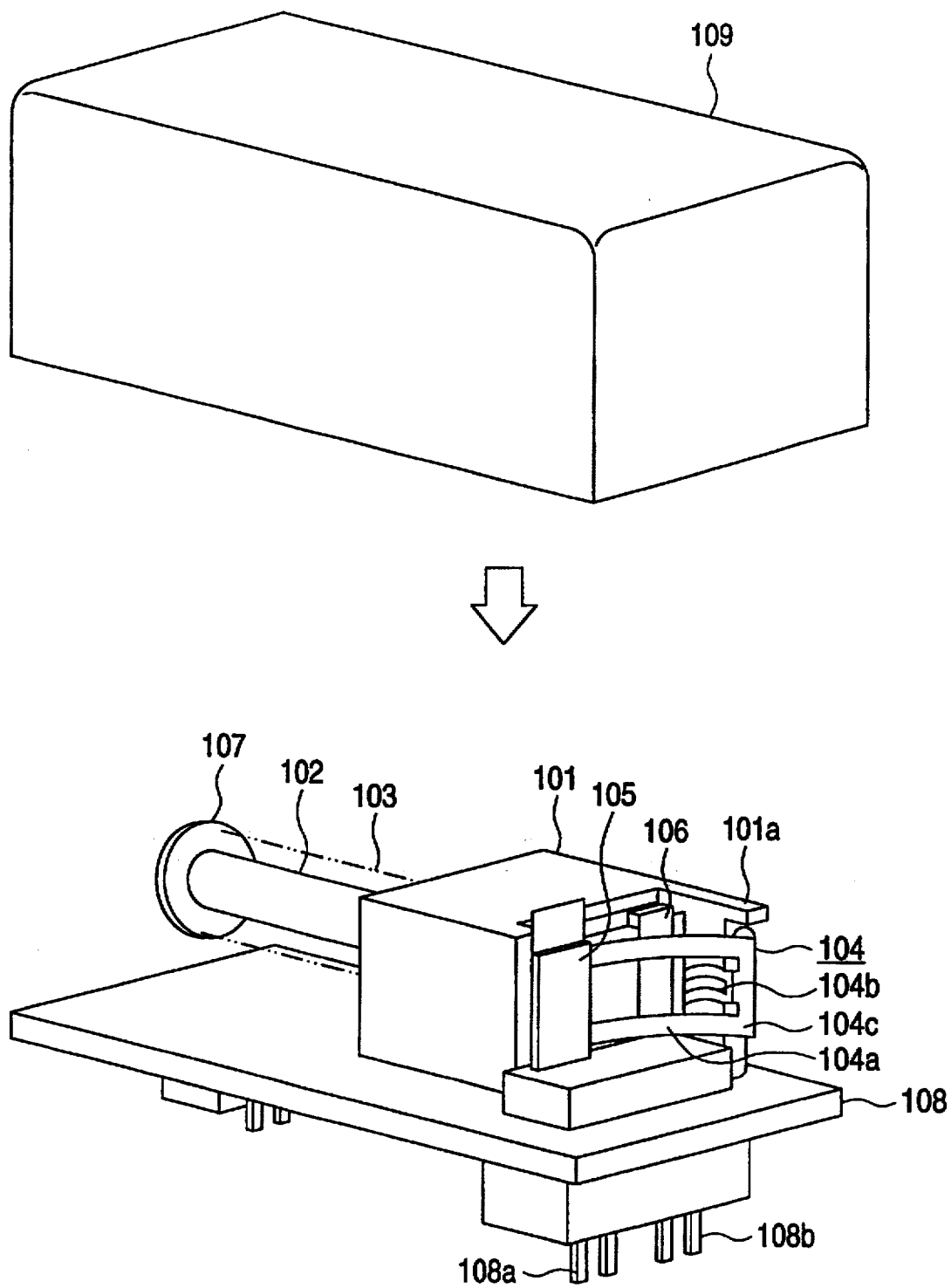
FIG. 16 is a perspective view showing a conventional collision detector.

FIG. 14 is a transverse sectional view to show a sixth embodiment of the invention. FIG. 15 is a wiring diagram among signal terminals of a collision detector. The sixth embodiment of the invention differs from the first embodiment in fixed contacts. Parts identical with or similar to those previously described in the first embodiment are denoted by the same reference numerals in the figures and will not be discussed again.

In FIGS. 14 and 15, numeral 20 is a first fixed contact with which one contact 3a of a moving contact 3 always comes in contact for taking out an electric signal. Numeral 21 is a second fixed contact as a third contact with which another contact 3a of the moving contact 3 comes in contact for taking out an electric signal in an initial state in which the vehicle is not decelerated due to a collision, etc. Numeral 22 is a third fixed contact as a second contact with which the contact 3a of the moving contact 3 in contact with the second fixed contact 21 moves and comes in contact for taking out an electric signal when a mass body 1 moves a given distance against the elastic force of the coil spring 6 because of a collision of the vehicle, etc.

Further, the first fixed contact 20 is provided with three signal terminals 20a, 20b, and 20c. The second fixed contact 21 is provided with one signal terminal 21a. The third fixed contact 22 is provided with two signal terminals 22a and 22b.

In FIG. 15, A and B are terminals connected to external devices and R is a resistor connected between the signal terminals 20c and 22b or a resistor connected between the signal terminal 21a and the terminal B. Each resistor R is set to a sufficiently large resistance value as compared with contact resistance in the collision detector, thereby lessening the effect of the contact resistance in the collision detector on signals output from the terminals A and B.

In the initial (normal) state in which the vehicle is not decelerated due to a collision, etc., the signal terminals 20b and 21a are electrically connected and resistance between the terminals A and B becomes ½ R. If the vehicle is decelerated due to a collision, etc., the signal terminals 20b and 22b are electrically connected and resistance between the terminals A and B becomes smaller than ½ R.

However, if an abnormal condition, such as a broken line or a deformed contact, occurs in the collision detector in the normal state and electric connection is not provided in the collision detector, the resistance between A and B becomes R, enabling detection of the abnormal condition.

Thus, in the sixth embodiment, contacts conducted at the normal time and those conducted at the collision time are provided for adding a self-diagnosis function to the collision detector.

As described above, in the embodiments, the contact is formed integrally in the mass body, and when the mass body makes a linear move, it can slide between the fixed contacts for taking out an electric signal, thereby miniaturizing the acceleration detector.

To smoothly slide the mass body, the slide shaft is provided, rotation of the mass body is regulated, and the mass body and the outer wall are shaped like a rectangular parallelopiped and are provided with a given clearance.

To provide stable contact resistance, the contact form of the moving contact is made a 180-degree or more arc beam form or a linear cantilever form with the tip having a rounded form, whereby the contact resistance of the moving contact with the fixed contact becomes stable and the slide between the moving and fixed contacts also becomes stable.

A notch is made in the insulation member so that the contact of the moving contact does not come in contact with other members in the initial state, a shock absorbing element is provided between the mass body and the stopper, the stopper is made of thermoplastic elastomer of rubber property, and the tip of the fixed contact is made a rounded form, whereby stable operation characteristics can be provided.

The mass body is divided into two pieces between which a part of the moving contact is sandwiched for connection, and nails for catching the mass body in the moving contact and fixing it are provided, thereby simplifying the shape and improving the assembly property.

To fix the fixed contact to the outer wall without floating up, a crush part is buried in the outer wall.

To furthermore miniaturize the acceleration detector, the mass body is made of a metal powder injection-molded article or a high-specific-gravity alloy powder sintered article having a specific gravity of 10 or more containing tungsten, etc.

A rib is disposed on the outer peripheral surface of the second stopper, whereas a groove is made in the outer wall face so that the rib and the groove form a labyrinth structure, or a projection made of thermoplastic elastomer of rubber property is provided on the outer peripheral surface of the second stopper, thereby sealing the acceleration detector for preventing the entry of an adhesive into the inside.

Rubber is baked and adhered onto the outer peripheral surface of the second stopper, or the second stopper is provided with the welding part which is thermally caulked onto one end of the outer wall. Thus, sealing and removal prevention for the second stopper can be achieved with no adhesive.

The self-diagnosis function can be given to the collision detector by providing the first fixed contact always coming in contact with one contact of the moving contact, the second fixed contact coming in contact with another contact of the moving contact only in the initial state in which no acceleration occurs in a collision direction, and the third fixed contact with which the contact of the moving contact in contact with the second fixed contact moves and comes in contact for taking out an electric signal when the mass body moves a given distance against the press force of the elastic member.

Formerly, the mass body was made of an iron-family material having a specific gravity of about 8 or a copper or brass-family material having a specific gravity of about 9; if the mass body 11 is molded with a sintered alloy material having a specific gravity of about 14 containing tungsten as a main component, the volume of the mass body decreases although the mass remains unchanged. For example, the mass body 10 mm in full length can be reduced to 6 mm for 40-percent miniaturization and the housing 27 mm in length can be reduced to 23 mm for 15-percent miniaturization.

What is claimed is:

1. An acceleration detector comprising:
   a mass body having a predetermined mass;
   a slide shaft slidably supporting said mass body;
   first and second regulation parts for limiting a slide range of said mass body at respective ends of said slide shaft;
   an elastic member disposed between said first regulation part and said mass body, and providing an elastic force for biasing said mass body in a direction toward said second regulation part;
   a case having at least one of said first and second regulation parts and a notch formed therein;
   a first contact integrally provided on said mass body; and
   a second contact provided in said notch of said case,
   wherein when said mass body slides on said slide shaft against said elastic force of said elastic member, said first contact slides together with said mass body, and when said first contact slides a predetermined distance, said first contact comes in contact with said second contact, to thereby establish an electric conduction between said first and second contacts.

2. An acceleration detector as claimed in claim 1, wherein said first regulation part is made of thermoplastic elastomer.

3. An acceleration detector as claimed in claim 1, wherein said second contact is integrally formed on said case simultaneously when said case is molded, and said second contact has a removal stopper projected therefrom.

4. An acceleration detector as claimed in claim 1, wherein a lid provided with said second regulation part and said case are formed with a recess and a mating projection, respectively, and said lid is fixed to said case by inserting said projection into said recess.

5. An acceleration detector as claimed in claim 1, wherein a lid provided with said second regulation part is fixed to said case by thermal caulking.

6. An acceleration detector as claimed in claim 1, wherein a lid provided with said second regulation part is provided with a seal part and is fixed to said case so that said seal part abuts said case.

7. An acceleration detector comprising:
   a mass body having a predetermined mass, formed by two mass members;
   a slide part for slidably supporting said mass body;
   a regulation part for limiting a slide range of said mass body;
   a biasing part for biasing said mass body in a predetermined direction;
   a first contact provided integrally on said mass body to be sandwiched and fixed between said two mass members of said mass body and slidable together with said mass body; and
   a second contact that said first contact abuts or leaves,
   wherein when predetermined acceleration occurs on said mass body, said mass body slides on said slide part against a biasing force of said biasing part and said first contact abuts or leaves said second contact.

8. An acceleration detector as claimed in claim 7, wherein said slide part includes a slide shaft fixed at both ends to said regulation part.

9. An acceleration detector as claimed in claim 7, wherein a tip of said first contact has a curved surface.

10. An acceleration detector as claimed in claim 7, wherein an end of said second contact has a curved surface.

11. An acceleration detector as claimed in claim 7, wherein said mass body is molded by executing sintering molding or injection molding of metal powder.

12. An acceleration detector comprising:
    a mass body having a predetermined mass;
    a slide shaft for slidably supporting said mass body;
    a regulation part for limiting a slide range of said mass body, said slide shaft fixed at both ends to said regulation part;
    a case for housing said mass body therein, said case having a rotating stopper abusable against said mass body for regulating rotation of said mass body about said slide shaft;
    a biasing part for biasing said mass body in a predetermined direction;
    a first contact provided integrally on said mass body and slidable together with said mass body; and
    a second contact that said first contact abuts or leaves,
    wherein when predetermined acceleration occurs on said mass body, said mass body slides on said slide shaft against a biasing force of said biasing part and said first contact abuts or leaves said second contact.

13. An acceleration detector as claimed in claim 12, wherein said first contact has a rotation stopper therefrom in parallel with said slide shaft and abutable against said mass body for stopping rotation of said first contact.

14. An acceleration detector comprising:
    a mass body having a predetermined mass, said mass body having a square shape;
    a slide part for slidably supporting said mass body;
    a regulation part for limiting a slide range of said mass body;
    a biasing part for biasing said mass body in a predetermined direction;
    a first contact provided integrally on said mass body and slidable together with said mass body; and
    a second contact that said first contact abuts or leaves,
    wherein a shock absorption member is provided on said mass body between said regulation part and said mass body for absorbing shock when predetermined acceleration occurs on said mass body, causing said mass body to slide on said slide part.

15. An acceleration detector comprising:
    a mass body having a predetermined mass, said mass body having a square shape;
    a slide shaft for slidably supporting said mass body;
    a regulation part for limiting a slide range of said mass body;
    a biasing part for biasing said mass body in a predetermined direction;
    a first contact integrally provided on said mass body and slidable together with said mass body; and
    second and third contacts that said first contact abuts or leaves, wherein when said mass body abuts said regulation part by said biasing part, said first contact abuts said third contact, and when predetermined acceleration occurs on said mass body and said mass body slides on said slide shaft against a biasing force of said biasing part, said first contact abuts said second contact.

16. An acceleration detector as claimed in claim 15, further comprising a fault determination section for sensing whether or not said first contact abuts said third contact and making a fault determination.

17. An acceleration detector comprising:

a mass body having a predetermined mass;

a slide shaft slidably supporting said mass body;

first and second regulation Darts for limiting a slide range of said mass body at respective ends of said slide shaft;

an elastic member disposed between said first regulation part and said mass body, and providing an elastic force for biasing said mass body in a direction toward said second regulation part;

a case having at least one of said first and second regulation parts;

a first contact integrally provided on said mass body; and a second contact is disposed on an inner peripheral surface of said case, and said first contact is disposed on a face of said mass body opposed to the inner peripheral surface of said case, wherein when said mass body slides on said slide shaft against said elastic force of said elastic member, said first contact slides together with said mass body, and when said first contact slides a predetermined distance, said first contact comes in contact with said second contact, to thereby establish an electric conduction between said first and second contacts.

* * * * *